(12) United States Patent
Girard

(10) Patent No.: US 9,644,954 B2
(45) Date of Patent: May 9, 2017

(54) DEVICE FOR MEASURING THE SURFACE STATE OF A SURFACE

(75) Inventor: Claude Girard, Saint Appollinaire (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/004,417

(22) PCT Filed: Mar. 8, 2012

(86) PCT No.: PCT/EP2012/054051
§ 371 (c)(1),
(2), (4) Date: Mar. 27, 2014

(87) PCT Pub. No.: WO2012/120100
PCT Pub. Date: Sep. 13, 2012

(65) Prior Publication Data
US 2014/0293292 A1    Oct. 2, 2014

(30) Foreign Application Priority Data
Mar. 10, 2011    (FR) ...................................... 11 51963

(51) Int. Cl.
G01B 11/30    (2006.01)
G01B 5/28     (2006.01)
G21C 17/017   (2006.01)

(52) U.S. Cl.
CPC .............. *G01B 11/30* (2013.01); *G01B 5/28* (2013.01); *G21C 17/017* (2013.01)

(58) Field of Classification Search
CPC ........ G01B 11/30; G01B 5/28; G21C 17/017; G01N 21/88; G01N 2021/9544
USPC ........... 356/600–635; 33/503, 551, 553, 559, 33/561; 73/105, 1.89
See application file for complete search history.

(56) References Cited

U.S. PATENT DOCUMENTS

| 2,772,565 | A   |   | 12/1956 | Brown, Jr. et al. |
| 5,146,690 | A   | * | 9/1992  | Breitmeier ...................... 33/551 |
| 6,193,709 | B1  | * | 2/2001  | Miyawaki et al. ............... 606/1 |
| 6,209,217 | B1  | * | 4/2001  | Tsuruta et al. .................. 33/554 |

(Continued)

FOREIGN PATENT DOCUMENTS

| DE | 102009035747 A1 | 3/2010 |
| EP |    2199732 A1   | 6/2010 |

OTHER PUBLICATIONS

International Search Report in PCT/EP2012/054051, dated May 14, 2012.

(Continued)

*Primary Examiner* — Sang Nguyen
(74) *Attorney, Agent, or Firm* — Nixon Peabody, LLP; Khaled Shami

(57) ABSTRACT

Devices for measuring the surface state of a surface, at least one portion of which has a surface curvature. The devices may include a probe for being in contact with the curved surface portion. The probe may be stressed on the surface with a substantially constant stress. A way to measure the displacement of the probe may be provided and arranged to measure the displacement of the probe along an axis substantially perpendicular to the surface. The probe may also be relatively displaced in relation to the surface only along a path following the surface curvature.

18 Claims, 4 Drawing Sheets

(56) References Cited

U.S. PATENT DOCUMENTS

| | | | |
|---|---|---|---|
| 6,295,866 B1* | 10/2001 | Yamamoto et al. | 73/105 |
| 6,543,150 B2* | 4/2003 | Matsumiya et al. | 33/553 |
| 6,657,216 B1* | 12/2003 | Poris | 250/559.22 |
| 6,874,243 B2* | 4/2005 | Hama et al. | 33/551 |
| 6,901,678 B2* | 6/2005 | Kubota | G01B 5/20 33/551 |
| 6,901,768 B1* | 6/2005 | Windecker | 62/407 |
| 7,228,642 B2* | 6/2007 | Enderle et al. | 33/561 |
| 8,140,178 B2* | 3/2012 | Hon | G01B 5/20 310/90.5 |
| 8,782,915 B2* | 7/2014 | Reitemeyer et al. | 33/559 |
| 8,915,124 B2* | 12/2014 | Nakayama | G01B 5/016 73/105 |
| 9,038,282 B2* | 5/2015 | McMurtry et al. | 33/503 |
| 2004/0221465 A1 | 11/2004 | Smith et al. | |
| 2007/0266781 A1* | 11/2007 | Nemoto et al. | 73/105 |
| 2008/0184579 A1* | 8/2008 | McFarland | G01B 21/04 33/551 |
| 2009/0292503 A1* | 11/2009 | Hon | B23Q 17/22 702/168 |
| 2010/0018069 A1* | 1/2010 | Ould | G01B 21/042 33/503 |
| 2011/0277543 A1* | 11/2011 | Mies | 73/105 |

OTHER PUBLICATIONS

International Preliminary Report on Patentability in PCT/EP2012/054051 (English translation), dated Mar. 9, 2013.
STIL: Optical Principles: 1 Confocal Chromatic, Industry Presentation, Sciences et Techniques Industrielles de la Lumiere ("STIL"), Domaine de Saint Hilaire, France pp. 1-3.

* cited by examiner

DEVICE FOR MEASURING THE SURFACE STATE OF A SURFACE

CROSS REFERENCE TO RELATED APPLICATIONS

This application is the national stage of International Application No. PCT/EP2012/054051, filed Mar. 8, 2012, entitled, "Device For Measuring The Surface State Of A Surface," which claims the benefit of priority of French Patent Application No. 11 51963, filed Mar. 10, 2011, the contents of both of which are incorporated herein by reference in their entirety.

TECHNICAL FIELD

The invention relates to the field of measuring the surface state of a surface and in particular to the determination of its surface roughness in order to classify the same surface.

The invention more particularly relates to a device for measuring the surface state of a surface.

Determining the surface state of surfaces has become a main issue as regards high-tech industries, such as aeronautics, car industry or even power generation. Indeed, the surface state—and more particularly the surface roughness—determines some surface characteristics and properties, such as their corrosion and wear resistances and their adhesion and gliding properties.

In the field of power generation, such as nuclear energy, this issue occurs in particular at gas ducts of power generation facilities. The surface state of the inner surface of these ducts has a significant impact on head losses. Indeed, this surface state is one of the main characteristics which determine the flow type of gases that pass through these ducts. Thus, a duct inner surface having a high roughness results in a turbulent flow and therefore has a high head loss. It is thus essential to know, and if need be to correct, the surface state of gas ducts.

STATE OF PRIOR ART

The measurement of the surface state of a surface is generally performed using a profilometry type device. This type of device is classified into two distinct categories, the contact profilometers and the optical profilometers.

Contact profilometers generally include a probe for being in contact with the surface, means for stressing the probe on the surface, means for measuring the displacement of the probe and means for displacing the probe along the surface. The probe is generally a tip of hard material, such as diamond, having a low size tip diameter.

The principle of this type of profilometer consists in displacing the probe along the surface by the action of displacing means, a constant stress of the probe on the surface being exerted by the stressing means during the displacement. During the same displacement, the means for measuring the displacement of the probe record displacements of the probe along an axis perpendicular to the surface and thus enable a surface profile to be obtained. This profile, when processed, gives information about the surface state of the surface as well as its surface roughness.

The means for measuring the displacement of the probe can employ capacitive, inductive, piezoelectric or even optical technologies. These are means for measuring the displacement of the probe, with the contact surface being between the probe and the surface to be measured, which determine the resolution of this type of profilometer.

Since this type of profilometer is intended to measure planar surfaces, the means for displacing the probe along the surface do not allow great amplitudes on the displacement along the axis perpendicular to the surface. The result is that it is not possible with such a type of profilometer to measure the surface state of a surface having a high curvature. Furthermore, if it is possible to perform this type of measurement on surfaces having a low surface curvature, the profile obtained has then an artefact relative to this curvature which requires a more complex electronic data processing upon determining the surface state.

The optical type profilometers take generally advantage of the reflection properties of the surfaces to be measured and employ optical measurement methodologies, such as interferometry, holography or confocal measurement.

The latter methodology, illustrated in FIG. 1, consists in using a point polychromatic source 1 and passing the light ray 2 coming therefrom through an objective lens 3 having a high axial chromatism. This results, with a location of the source 1 at the object focus of the objective lens 3, in a continuum of monochromatic images 4a, 4b and 4c evenly distributed along the optical axis 5 of the objective lens 3.

Upon measuring the surface state of a surface 6, the surface 6 is located so as to intercept the optical axis 5 and reflect the light ray 2. The light ray 2 thus reflected passes back through the objective lens 3 and is directed, by reflection on a semi-reflecting blade 7, on the inlet 8 of a spectrometer 9 provided at a distance equivalent to the object focus of the objective lens 3. This results in that only the corresponding monochromatic image 4b at the intersection between the surface 6 and the optical axis 5 is focused at the aperture 8 of the spectrometer 9. This focusing is the cause of an intensity peak 10 in the optical spectrum 11 measured by the spectrometer 9, the wavelength of this intensity peak 10 enabling the distance of the surface 6 at the intersection with the optical axis 5 to be determined.

Thus, a surface scanning enables a surface profile to be provided and, after processing, information about the surface state of the surface and its surface roughness to be determined.

This type of profilometer, so as to offer a good resolution in height, has a field depth wherein monochromatic images are distributed, which is reduced. This restricts the measurable variations in height, and thus the allowable surface curvatures with such a type of profilometer. This type of profilometer thus does not enable the surface state of a surface having a high surface curvature to be measured.

A similar methodology is also employed in confocal measurement displacement sensors.

DISCLOSURE OF THE INVENTION

One object of the present invention is to provide a device for measuring the surface state which enables the surface state of a surface having a high surface curvature to be measured.

To that end, the invention relates to a device for measuring the surface state of a surface, said surface comprising at least one portion having a surface curvature, the device including:
   a probe for being in contact with said surface portion,
   means for stressing the probe on the surface with a substantially constant stress,
   means for measuring the displacement of the probe which are arranged to measure the displacement of the probe along an axis substantially perpendicular to the surface,
   means for relatively displacing the probe, the means for relatively displacing the probe being suitable for displacing the probe in relation to the surface along a path only following the surface curvature.

Adapting the means for relatively displacing the probe to displace the probe in relation to the surface along a path following the surface curvature enables the probe to be displaced along the surface and thus the profile to be measured throughout the surface curvature. This adaptation also enables artefacts related to the curvature to be restricted. Indeed, since displacements of the probe along the surface curvature are performed by means of the relative displacement means, the displacements measured by the means for measuring the displacement of the probe correspond to the displacements related to the surface roughness without interference of the surface curvature.

The relative displacement means can be suitable for displacing the probe in relation to the surface along a circular path only at an angle at least equal to 100° and preferentially equal to 180°.

The device can be particularly intended to measure the surface state of the inner surface of a tube having a substantially torus portion shape, the relative displacement means being suitable for relatively displacing the probe along an inner generatrix of the tube, said generatrix forming the surface curvature.

By generatrices of a torus, it is meant all of the circular curves the centre of which passes through the torus axis, which are perpendicular to the same axis and which generate the torus surface.

Thus, the device enables the surface state to be measured along the tube generatrix, and thus, the head losses to be assessed which, in the same tube, could be related to the surface roughness.

The relative displacement means could include a turntable for supporting the tube, the turntable being pivotably mounted in relation to the probe so as to allow the relative displacement of the probe along the generatrix.

Such a turntable enables the tube to be adequately supported and displaced such that the probe can measure the surface state along the inner generatrix of the tube.

The pivoting mounting of the turntable can be motorized, preferentially with an indexed displacement.

Such a motorized pivoting of the turntable enables the measurement to be automated, wherein the accuracy of the same can be optimized by indexing the displacement.

The device can further include an arm having a free end supporting the probe, the arm having a curvature identical to that of the torus portion so as to allow the relative displacement of the probe along the generatrix.

Such an arm, by virtue of its curvature identical to the torus curvature, enables the probe to be simply supported by restricting the interaction risks between the probe, and wiring connected thereto, with the tube walls.

Means for rotating the probe can also be provided, which is suitable for rotatably displacing the probe along the inner surface of the tube so as to change the generatrix along which the probe is relatively displaced by the relative displacement means.

Such pivoting means enable the probe to be transversely displaced along the inner surface thus allowing the measurement of the surface state of the tube along several generatrices of the same tube.

The means for measuring the displacement can include an optical type displacement sensor, the sensor being preferentially a confocal measurement displacement sensor.

Such a displacement sensor has a low overall volume while offering an adequate resolution to measure the roughness along the tube generatrix.

According to a first alternative embodiment, the stressing means can include a pivotably mounted lever and at the end of which is provided the probe, the lever including a counterweight so as to stress the probe on the surface by the action of gravity, the counterweight being preferentially displaceable along the lever.

Such a counterweight, in combination with a lever, enables stressing means having a simple and accurate adjustment of the stresses applied to the probe to be provided.

According to another alternative embodiment, the stressing means can include elastic return means arranged to apply a return force to the probe so as to stress the probe on the surface.

Such stressing means enable stresses to be applied to the probe the direction of which is not imposed by gravity.

The arm can include at its free end a pivoting portion, the pivoting portion being arranged to pivot about an axis tangential to the arm curvature and the probe being supported by said pivoting portion.

Such a pivoting portion allows, when measuring along any generatrix of a tube, an adequate placement of the probe to enable the measurement along this generatrix.

The stressing means can further include means for monitoring the stress of the probe on the surface.

Such monitoring means enable the stress applied to the probe to be accurately known throughout the measurement of the surface state of the surface.

The device can further include disengaging means arranged to move the probe away from the surface.

Such disengaging means enable the probe to be moved away from the surface during displacements of the surface which are not related to a surface state measurement.

The stressing means can include a pivotably mounted lever at the end of which the probe is mounted, and the disengaging means is formed by a system for swinging the lever.

Such a system for swinging the lever enables simple and robust disengaging means to be provided.

The swinging system can include a micromanipulator preferentially of the piezoelectric type.

Such a micromanipulator enables the disengagement of the probe to be precisely controlled.

BRIEF DESCRIPTION OF THE DRAWINGS

The present invention will be better understood upon reading the description of exemplary embodiments, given by way of indicative and in no way limiting purposes, making reference to the appended drawings wherein.

Identical, similar or equivalent parts in the different figures bear the same reference numerals so as to facilitate switching from one figure to another.

Different possibilities (alternatives and embodiments) should be understood as not excluding each other and can be combined with each other.

DETAILED DISCLOSURE OF PARTICULAR EMBODIMENTS

Figure 2:
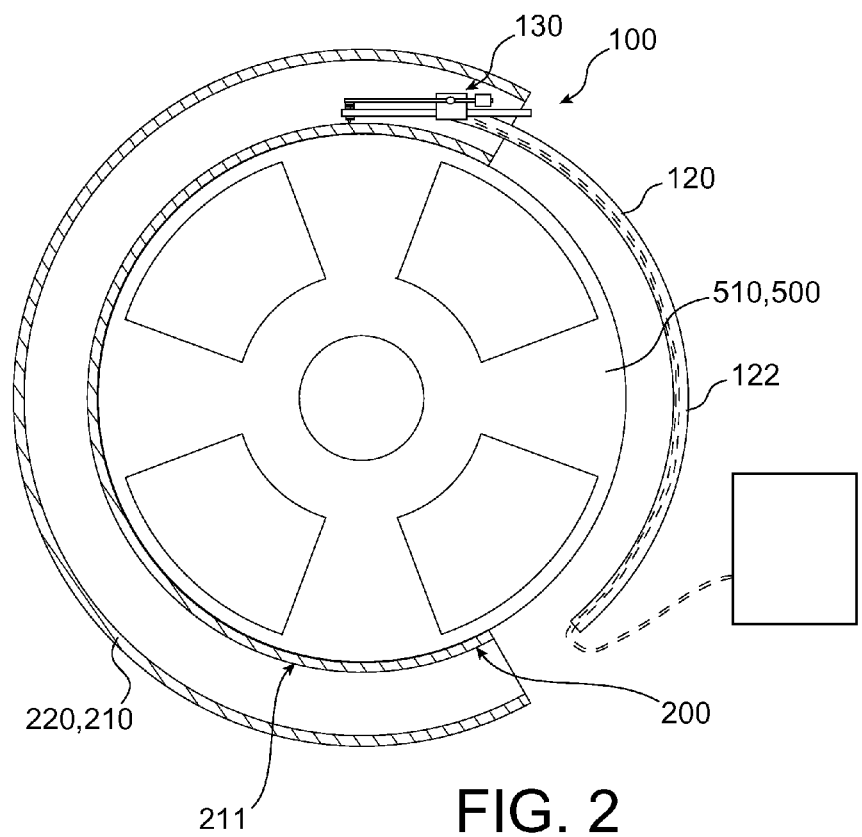
FIG. 2 illustrates an embodiment of the measurement device according to the invention.

FIG. 2 presents an embodiment of a device 100 for measuring the surface state of a surface 200 according to the invention upon measuring the surface state of the inner surface 200 of a tube 220 having a torus portion shape.

Such a device 100 includes a measuring head 130.

Figure 3:
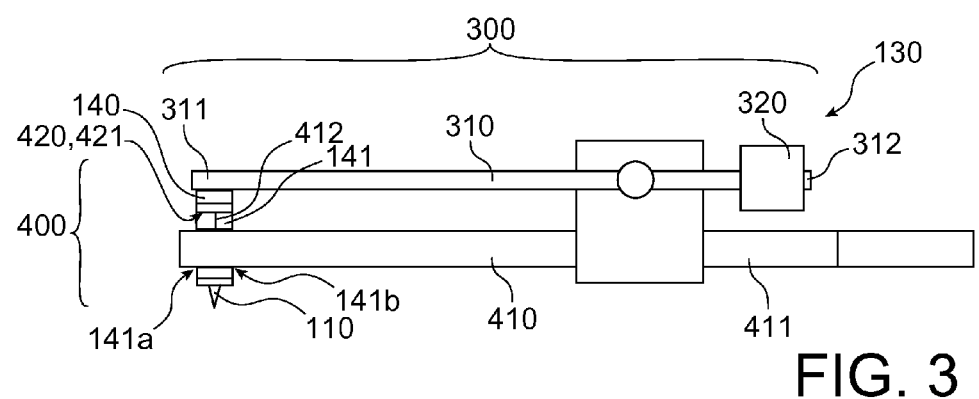
FIG. 3 illustrates the measurement head of a measurement device according to this same embodiment.

The measuring head 130, as illustrated in FIG. 3, includes a probe 110. The probe 110 can take the form of a tip of hard material, such as diamond, tungsten carbide or silicon carbide. The tip, having a generally conical shape, has a tip curvature radius as small as possible. For applications in measuring surface state of the inner surface 200 of a tube 220, a tip radius in the order of 2 μm is desirable.

The measuring head 130 further includes a lever 310 pivotably mounted to the measuring head 130. The lever 310 has two ends 311 and 312. The probe 110 is mounted to the first end 311 of the lever 310. The lever 310 has at its second end 312 a counterweight 320. The counterweight 320 is preferentially displaceably mounted along the lever 310 so as to enable a stress applied to the probe 110 to be adjusted.

The lever 310 and the counterweight 320 form means 300 for stressing the probe 110 on the surface 200.

The measuring head 130 can include a force cell for accurately measuring the stress of the probe 110 on the surface 200. This force cell, not illustrated, forms means for monitoring the stress of the probe 110 on the surface 200.

Mounting the probe 110 to the lever 310 is performed by means of a supporting part 140 having a through cavity 141. The cavity 141 of the supporting part 140 has two apertures 141a and 141b facing each other along the axis of the lever 310. The cavity 141 has on one of its walls 420, the wall 420 farthest from the probe 110, a reflecting surface 421.

Figure 1:
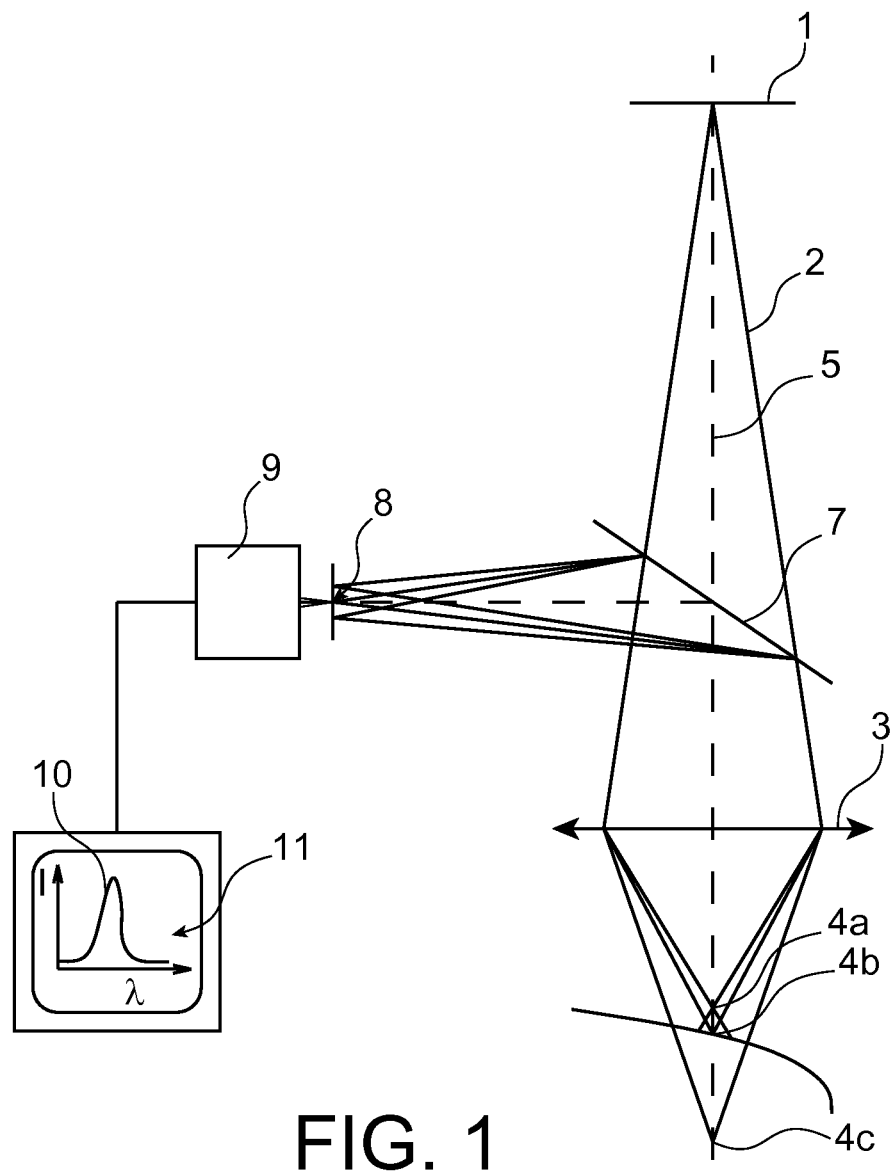
FIG. 1, from the Web site of STIL S.A company [1], illustrates the confocal type distance measurement methodology used in some optical profilometers and in confocal measurement displacement sensors.

The measuring head 130 further includes a confocal measurement displacement measurement sensor 410 according to a principle identical to that presented in FIG. 1. The sensor 410 has a substantially longitudinal sensor body 411. The sensor body 411 is provided along an axis parallel to the lever 310 when the same is at rest. The sensor body 411 is positioned on the measuring head 130 such that the sensor body 411 passes through the cavity 141.

The sensor 410 is a radial type confocal measurement sensor, that is having a measurement optical axis 412 perpendicular to the sensor body 411, and thus perpendicular to the lever 310. The optical axis 412 of the sensor 410 is provided such that the light radiation coming from the sensor 410 is reflected by the reflecting surface 421 of the cavity 141.

The sensor 410 and the reflecting surface 421 form the means 400 for measuring the displacement of the probe 110.

Figure 4:
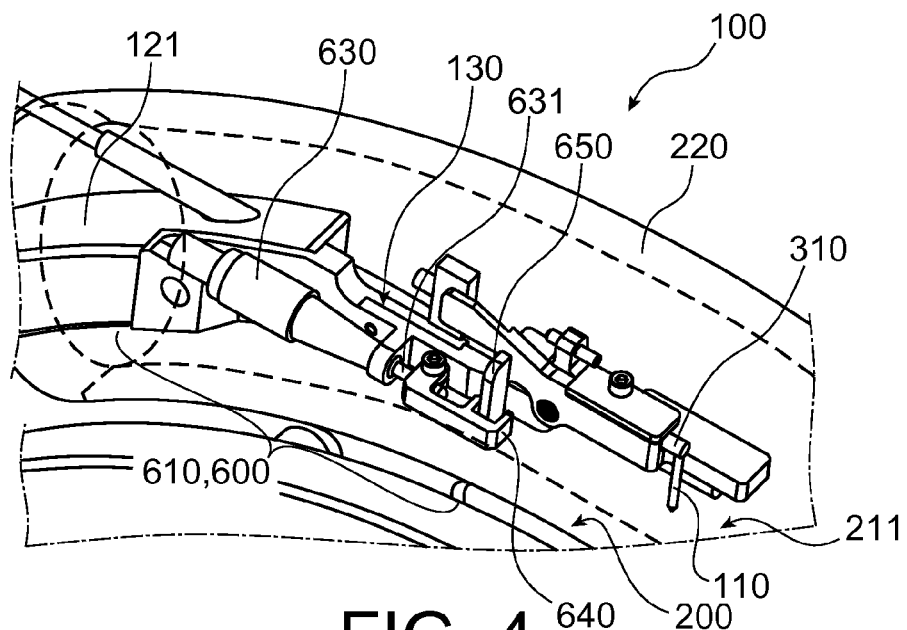
FIG. 4 illustrates the system for swinging a measurement device according to the same embodiment.

The measuring head 130 further includes a swinging system 610. The swinging system, as illustrated in FIG. 4, includes a cylinder 630, a double stop 640 and a pressing member 650 projecting from the lever 310. The double stop 640 is provided at the movable end 631 of the cylinder 630 and surrounds the pressing member 650. Thus, the lever 310 can be displaced between an engaged position wherein the probe 110 is in contact with the surface 200 and a disengaged position wherein the probe 110 is apart from the surface 200. The double stop 640 is configured to offer a freedom of movement to the lever 310 being sufficient for, when in engaged position, the movement of the probe 110 not to be hindered.

The swinging system 610 forms disengagement means 600.

The device 100 further includes an arm 120 having a free end 121. The free end 121 supports the measuring head 130. The arm 120 enables wirings to pass between the measuring head 130 and the remainder of the device 100. The arm 120 has a curvature 122 substantially identical to that of the surface 200 to be measured so as to allow the displacement of the surface 200 to be measured in relation to the measuring head 130.

The device 100 further includes a supporting turntable 510 for supporting the tube 220 to be measured. To enable the surface state of the inner surface 200 of the tube 220 to be measured, the turntable 510 has a generally substantially circular shape, the tube 220 being mounted to the external perimeter 510 of the turntable 510. The turntable 510 is pivotably mounted in relation to the probe 110 such that, upon pivoting the turntable 510, the probe 110 follows the surface curvature 211 of the inner surface 200 of the tube 220. The turntable 510 is mounted so as to allow the arm 120 to penetrate the tube 220 and such that the tube 220 has a path corresponding to the curvature 122 of the arm 120.

To enable the measurement to be automated, mounting the turntable 510 is preferentially motorized. This motorization, in an effort to provide a measurement of the surface state which is reliable, can be indexed. This indexation can be performed by use of a coder (not illustrated).

The motorization can be configured to pivot the turntable at an angle at least equal to 100° and preferentially equal to 180°.

The turntable 510 and its motorized mounting form means 500 for relatively displacing the probe 110.

Thus, upon measuring the surface state of the inner surface 200 of the tube 220, the tube 220 is placed on the turntable 510. The turntable 510 is then pivoted so as to place the inner surface 200 of the tube 220 facing the measuring head 130. The lever 310 is then positioned in the engaged position by the disengagement system 610. In this position, the probe 110 is stressed by the counterweight 320 on the surface 200. The force cell enables the stress exerted by the counterweight 320 to be measured and the stress to be accurately adjusted by the placement of the counterweight 320.

Once the stress exerted by the counterweight 320 is adjusted, the turntable 510 is pivoted to enable the probe 110 to travel the generatrix 211 of the tube 220. Thus, the probe 110 is displaced only along the generatrix 220. Throughout this displacement, the confocal measurement displacement sensor 410 enables displacements of the probe 110 to be measured along the axis perpendicular to the inner surface 200 of the tube 220. Thus, the recording of these displacements enables a profile of the inner generatrix 211 of the tube 220 to be obtained without artefact related to the shape of the tube 220.

Figure 5:
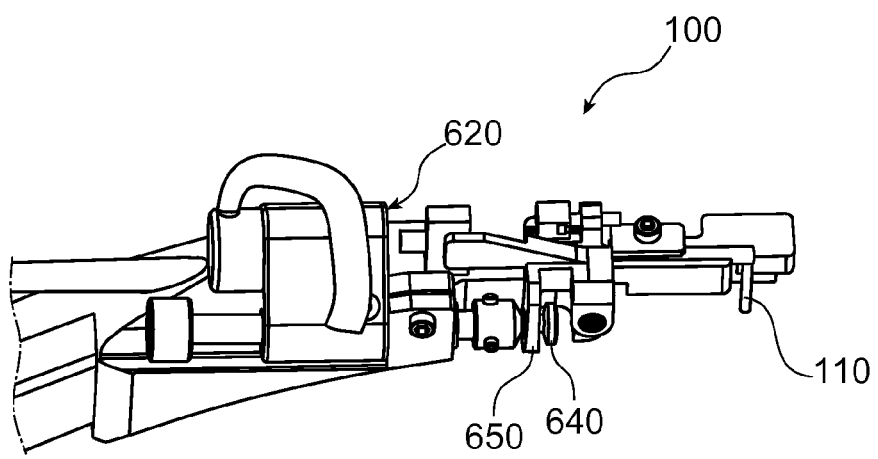
FIG. 5 illustrates an alternative embodiment of the swinging system.

According to a first alternative embodiment, illustrated in FIG. 5, the swinging system 610 of the lever 310 can include a micromanipulator 620. A device 100 according to this alternative embodiment differs from the previously described embodiment in that the cylinder 630 is replaced by a micromanipulator 620 and in that the double stop 640 is mounted to the micromanipulator 620.

Thus, with such a micromanipulator 620, the lever 310 can be accurately displaced between the engaged position and the disengaged position with the possibility to position the lever 310 at an intermediate position to compensate for possible variations in dimensions and positioning the tube 220 to be measured.

Figure 6:
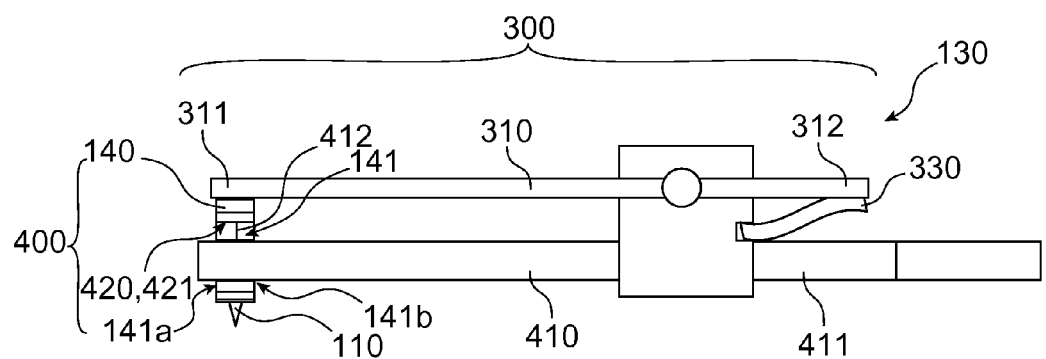
FIG. 6 illustrates an alternative embodiment of the stressing means.

According to another alternative embodiment, partially illustrated in FIG. 6, the device 10 can be suitable for measuring the surface state along any generatrix of the tube 220. A device 100 according to this alternative embodiment differs from a device according to the embodiment or the alternative embodiment previously described in that elastic return means 330 stress, in lieu of the counterweight 320, the probe 110 on the surface 200 and in that the arm 120 has at its free end 121 a portion (not illustrated) pivoting about an axis tangential to the curvature 122 of the arm 120, this pivoting portion supporting the measuring head 130.

Thus, the elastic return means 330 (for example a spring leaf) enable the probe 110 to be stressed on the surface 200 without the action of gravity. As a result, the generatrix along which the measurement of the surface state is performed is not necessarily the inner generatrix 211, since the stress is no longer necessary directly downwards.

The measurement of the surface state of a surface 200 with a device 100 according to this alternative embodiment differs from that of the previously described embodiment in that it is necessary, before positioning the lever 310 in the engaged position, to pivot the pivoting portion so as to place the probe 110 along the generatrix of the tube 220 desired for the measurement of the surface state.

Figure 7:
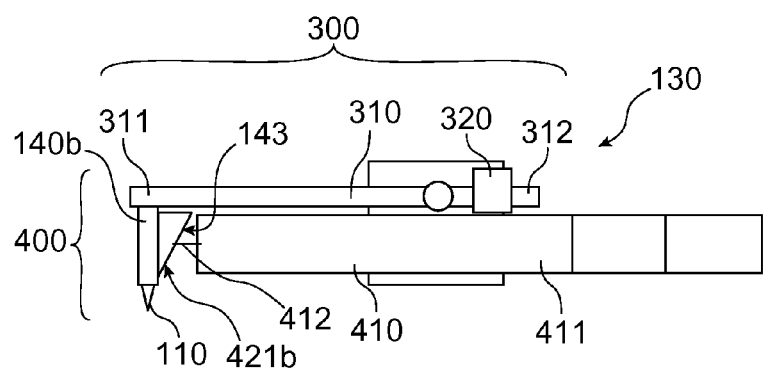
FIG. 7 illustrates an alternative embodiment of a measuring head including an axial confocal measurement displacement sensor.

According to another alternative embodiment illustrated in FIG. 7, the confocal measurement displacement sensor 410 is an axial confocal measurement displacement sensor 410, that is having an optical axis 412 extending from the sensor body 411. A device 100 according to this alternative embodiment differs from a device according to the previously described embodiment or alternative embodiment in that further the probe 110 is mounted to the lever 310 by means of a supporting part 140b not having an open cavity and including a tilted plane 143 the surface 421b of which, facing the confocal measurement displacement sensor 410, is reflecting. The tilted plane 143 is tilted from the middle of the lever 310 in the direction of its first free end 311 and the lever 310 in the direction of the surface 200.

Thus, the displacements of the probe 110 perpendicular to the sensor body 411 generate a displacement of the tilted plane 143 along the same direction. These displacements offset the point of intersection between the tilted plane 143 and the optical axis 412 of the sensor. This offset, once recorded by the confocal measurement displacement sensor 410 then enables the displacement of the probe 110 to be retrieved. Such a configuration offers a better integration to the measuring head 130 of the confocal measurement displacement sensor 410, thus restricting the overall volume of the measuring head 130.

If in the embodiment and alternative embodiments of the device 100 which are described above, the means 400 for measuring the displacement of the probe 100 include a confocal measurement displacement sensor, the device can also include a displacement sensor of another type, whether optical or not, without departing from the scope of the invention.

Also, if the embodiment and alternative embodiments of the device 100 which are described above are suitable for measuring the surface state of the inner surface 200 of a tube 220 having a torus portion shape, the device 100 can be suitable for measuring the surface state along a surface of another type without departing from the scope of the invention, if it includes at least one portion having a surface curvature. In this configuration, the turntable and its mounting are suitable for enabling a movement along this surface curvature.

Also, if according to the above described embodiment and alternative embodiments of the device 100, the surface 200 is displaced along the probe 110, the surface 200 can be fixed without departing from the scope of the invention. In this configuration, it is the measuring head which is movably mounted by means, for example, of a rail so as to follow the surface curvature.

According to a non-illustrated possibility, the device 100 can include a system for pivoting the probe 110 for the latter to be transversely displaceable along the inner surface of the tube 220. Thus, the pivoting system enables, after checking the surface state along a first generatrix 211 of the tube 220, the probe 110 to be pivoted to allow the measurement along another generatrix of the tube 220. The pivoting system is preferentially suitable for pivoting the probe 110 by 360° thus giving access to all the generatrices of the tube 220.

Thus, upon characterising a tube 220, the device 100 can be configured, for example, for performing consecutive state measurements along four generatrices arranged at 90° with respect to each other, the probe being pivoted by 90° between each of the measurements.

Such a pivoting system forms means for rotating the probe 110 suitable for rotatably displacing the probe 110 along the inner surface of the tube 220 so as to change the generatrix 211 along which the probe 110 is relatively displaced by the relative displacement means 500.

REFERENCES MENTIONED

[1] http://www.stilsa.com/EN/pdf/optical%20principles%20CCS.pdf

The invention claimed is:
1. A method for measuring the surface state of a surface of a tube, the surface comprising at least one portion having a surface curvature, the method comprising the following successive steps in the following order:
  measuring the surface curvature of the portion,
  providing a support for the tube,
  providing a measurement head comprising a probe for being in contact with the surface portion, the head being configured to stress the probe on the surface and measure the displacement of the probe along a displacement axis,
  mounting the measurement head displaceable relatively to the support, at least a part of the head being mounting only displaceable relatively to the support along a trajectory corresponding to the measured surface curvature, the displacement axis being substantially perpendicular to the trajectory, thereby obtaining a device comprises the measurement head for measuring the surface state of the surface of the tube,
  mounting the tube on the support of the device for measuring the surface state of the surface of the tube, and
  measuring the surface state of a surface of the tube by displacing the head relatively to the support and the tube along the trajectory corresponding to the measured surface curvature and thereby obtaining the surface state of the surface of the tube.

2. A device for measuring the surface state of a surface of an tube, the device being fabricating during the implementation of the method of claim 1, the surface comprising at least one portion having a surface curvature, the device including:
- a support for the tube,
- a measurement head comprising a probe for being in contact with said surface portion, the measurement head being mounted to be relatively displaceable to the support, at least a part of the measurement head being mounted only displaceable relatively to the support along the trajectory, the measurement head being configured for stressing the probe on the surface with a substantially constant stress and for measuring the displacement of the probe along the displacement axis.

3. The device according to claim 2, wherein the a tube have a substantially torus portion shape, the portion having the surface curvature being the inner surface of the tube, the surface curvature of the inner surface being an inner generatrix of the tube, the trajectory corresponding to a path following the inner generatrix of the tube, when the tube is mounted on the support.

4. The device according to claim 3, wherein the support is a turntable for supporting the tube, the turntable being pivotably mounted in relation to the measurement head so as to allow the relative displacement of the measurement head along the generatrix when the turntable is turned.

5. The device according to claim 4, wherein the pivoting mounting of the turntable is motorized with an indexed displacement.

6. The device according to claim 4, wherein the device further includes an arm including a free end supporting the measurement head, the arm having a curvature identical to that of the torus portion so as to allow the relative displacement of the measurement head along the generatrix when the turntable is turned.

7. The device according to claim 6, wherein the measuring head includes a pivot at the free end of the arm, the pivot being arranged to allow a remaining of the measuring head to pivot about an axis tangential to the trajectory, the pivot being the part of the measuring head mounted relatively to the support displaceable relatively to the support only along the trajectory.

8. The device according to claim 3, the measurement head comprising a pivot rotatably displacing the head along the inner surface of the tube so as to change the generatrix along which the probe is relatively displaced.

9. The device according to claim 2, wherein the measurement head includes an optical type displacement sensor for measuring the displacement of the probe along an axis substantially perpendicular to predetermined trajectory.

10. The device according to claim 9, wherein the sensor is a confocal measurement displacement sensor.

11. The device according to claim 2, wherein the measurement head includes a pivotably mounted lever and at the end of which is provided the probe, the lever including a counterweight so as to stress the probe on the surface by the action of gravity.

12. The device according to claim 11, wherein the measuring head is configured for monitoring the stress of the probe on the surface.

13. The device according to claim 12, wherein measuring head present a configuration in which the probe moves away from the surface.

14. The device according to claim 13, wherein the measuring head includes a pivotably mounted lever at the end of which is mounted the probe, and a system for swinging the lever to move away the probe from the surface.

15. The device according to claim 14, wherein the system for swinging the lever includes a micromanipulator.

16. The device according to claim 15, wherein the micromanipulator is of the piezoelectric type.

17. The device according to claim 11, wherein the counterweight is displaceable along the lever.

18. The device according to claim 2, wherein the measurement head includes elastic return means arranged to apply a return force to the probe so as to stress the probe on the surface.

* * * * *